United States Patent Office 3,253,051
Patented May 24, 1966

3,253,051
PROCESS OF PRODUCING ISOPRENE
Masaya Yanagita and Takashi Mitsui, Tokyo, and Masao Kitahara, Chiba-shi, Japan, assignors to Rikagaku Kenkyusho, Tokyo, Japan, a corporation of Japan
No Drawing. Filed Dec. 6, 1963, Ser. No. 328,467
Claims priority, application Japan, May 13, 1963, 38/23,961, 38/23,962, 38/23,963, 38/23,964, 38/23,965
4 Claims. (Cl. 260—681)

This invention relates to a process for the direct production of isoprene from isobutylene and formaldehyde.

As a result of the recent growing demand for isoprene as a starting material for the production of synthetic rubber and the like, it is desirable to manufacture a high-purity isoprene in an economic way.

To satisfy the general desire, many processes by the condensation of isobutylene and formaldehyde have hitherto been proposed. They are roughly classified into two general methods. One is a two-stage method in which the first step is the condensation of isobutylene and formaldehyde to an intermediate product such as 4,4-dimethyl-1,3-dioxane and then, by the second step, said intermediate product is converted to isoprene usually in vapor phase as represented by the Formula 1. The other method is a direct method (one-stage method) of obtaining isoprene by the reaction of isobutylene with formaldehyde in vapor phase as by the Formula 2.

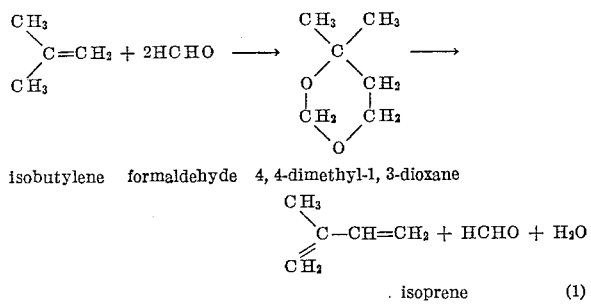

isobutylene  formaldehyde  4,4-dimethyl-1,3-dioxane

. isoprene (1)

From this scheme, one step is:

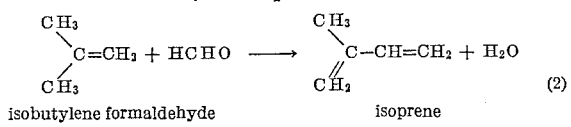

isobutylene formaldehyde  isoprene (2)

For the direct method with which the present invention is related, numerous types of catalysts have been proposed, including alumina, silica-alumina and cadmium phosphate. However, none has yet been considered as fully satisfactory for the purpose of producing isoprene effectively.

This invention relates to an improved process for obtaining isoprene directly by the condensation of isobutylene and formaldehyde in vapor phase by the catalyst composed of an oxide or hydroxide of chromium, manganese, silver, an element of the iron family (iron, nickel, and cobalt) or an element in Group IIa of the Periodic Table, or a mixture of more than two such compounds, and phosphoric acid.

The oxides and hydroxides of metals used as the catalysts under the invention are obtained by suitable processes, and the types of phosphoric acid which can be used for the purpose include orthophosphoric acid, pyrophosphoric acid, metaphosphoric acid, phosphoric anhydride, their mixture and polyphosphoric acid.

A mixture of compounds in those two groups gives a catalyst for the invention, by heat treatment or otherwise. Of course, it is possible, if needed, to add other substances to the catalyst or to deposit the catalyst on a suitable carrier such as silica, alumina, diatomaceous earth or activated clay.

The materials to be used are isobutylene and formaldehyde, but other substances which can yield them under reaction conditions, such as corresponding alcohols for isobutylene, and formaldehyde polymers and the like for formaldehyde, may also be employed. Under the invention these two materials are reacted with each other in vapor phase at a temperature from 150 to 450° C., preferably from 180 to 350° C. The reaction pressure is usually atmospheric, but the reaction may be effected under pressure or under reduced pressure as well.

In carrying out the reaction, some substances which are inert to the reaction, e.g. water, carbon dioxide or nitrogen or similarly inactive organic compounds, e.g. saturated or unsaturated hydrocarbons, may be added to the reactant system, if desired, in order to carry out the reaction effectively by removing the heat of reaction or otherwise. The molar ratio of isobutylene to formaldehyde may be varied according to the various reaction conditions, but excess of isobutylene is usually preferable. Similarly, the space velocity may be varied, but it is usually preferred to be between about 0.2 to 30 mols of formaldehyde per liter of the catalyst per hour. The catalyst may take the form of a fixed bed, fluidised bed, moving bed method or the like as desired.

The reaction product is either condensed or is absorbed by a suitable solvent, and is separated by fractional distillation or other suitable procedures. Unreacted isobutylene and formaldehyde can be recycled to the reaction system. The isoprene obtained by the process of this invention has a sufficiently high purity as a raw material for synthetic rubber and the like.

Example 1

In 60 cc. of water, 5% of chromic anhydride and 11 g. of 85% phosphoric acid are dissolved. Then the mixture is adsorbed into 25 g. of diatomaceous earth, dried and heat-treated for 4 hours at 570–630° C. to obtain a chromium oxide-phosphoric acid catalyst. Then, a mixture of isobutylene and formaldehyde (vaporised from 37% formalin solution) in the molar ratio of 1:3.5 is passed over said catalyst at a space velocity of 7 mols of formaldehyde per hour per liter of the catalyst. Thereafter, the reaction product is cooled, collected and distilled to obtain a high-purity isoprene. The results are tabled below for runs conducted at two reaction temperatures:

| Reaction temperature, ° C. | Conversion of formaldehyde, percent | Selectivity to isoprene, percent | Purity of isoprene (in C₅ fraction), percent |
|---|---|---|---|
| 250 | 58 | 52 | 99.2 |
| 300 | 69 | 47 | 98.9 |

Example 2

In 45 cc. of water, 4 g. of manganese chloride is dissolved, and 25 g. of silica gel is dipped in the solution. Next, the resultant product is treated with ammonia, washed with water, and mixed with 2.5 g. of 85% phosphoric acid. It is then dried, and heat-treated for 2 hours at 400° C. Thus, a manganese oxide-phosphoric acid catalyst is obtained. A mixture of isobutylene and formaldehyde (vaporised from 37% formalin solution) in the molar ratio of 1:4.1 is passed over said catalyst at a space velocity of 8 mols of formaldehyde per hour per liter of the catalyst.

Thereafter, the reaction product is cooled, collected and distilled to obtain a high-purity isoprene. The results are tabled below:

Reaction temperature, ° C. _____ 275
Conversion of formaldehyde, percent _____ 31
Selectivity to isoprene, percent _____ 57
Purity of isoprene (in $C_5$ fraction), percent _____ 99.4

*Example 3*

In 50 cc. of water, 2.2 g. of silver nitrate is dissolved, and 50 g. of active charcoal is dipped in the solution. The resultant product is treated with ammonia, washed with water, mixed with 0.75 g. of 85% phosphoric acid, dried and then heat-treated for one hour at 370° C. to obtain a silver oxide-phosphoric acid catalyst. A mixture of isobutylene and formaldehyde (vaporised from 37% formalin solution) in the molar ratio of 1:3.5 is passed over said catalyst at a space velocity of 7 mols of formaldehyde per hour per liter of the catalyst. Thereafter, the reaction product is cooled, collected and distilled to obtain a high-purity isoprene. The results are tabled below:

Reaction temperature, ° C. _____ 250
Conversion of formaldehyde, percent _____ 37
Selectivity to isoprene, percent _____ 55
Purity of isoprene (in $C_5$ fraction), percent _____ 99.1

*Example 4*

Into 50 cc. of water, 12 g. of ferric chloride is dissolved, and 75 g. of Japanese acid clay is dipped in the solution. The resultant product is treated with ammonia, washed with water, mixed with 14 g. of 85% phosphoric acid, dried, and then heat-treated for two hours at 450° C. to obtain an iron hydroxide-phosphoric acid catalyst. A mixture of isobutylene and formaldehyde (vaporised from 37% formalin solution) in the molar ratio of 1:3.9 is passed over said catalyst at a space velocity of 7 mols of formaldehyde per hour per liter of the catalyst. Thereafter, the reaction product is cooled, collected, and distilled to obtain a high-purity isobutylene. The results are given in the following table:

Reaction temperature, ° C. _____ 250
Conversion of formaldehyde, percent _____ 31
Selectivity to isoprene, percent _____ 58
Purity of isoprene, percent _____ 99.2

*Example 5*

(I) Into 75 cc. of water, 9 g. of magnesium chloride is dissolved, and 50 g. of silica gel is dipped in the solution. The resultant product is treated with ammonia, washed with water, mixed with 5 g. of 85% phosphoric acid, dried and treated for two hours at 370° C. to obtain a magnesium hydroxide-phosphoric acid catalyst. A mixture of isobutylene and formaldehyde (vaporised from 37% formalin solution) in the molar ratio of 1:3.2 is passed over said catalyst at a space velocity of 7 mols of formaldehyde per hour per liter of the catalyst. Thereafter, the reaction product is cooled, collected and distilled to obtain a high-purity isobutylene. The results are given in the following table:

Reaction temperature, ° C. _____ 275
Conversion of formaldehyde, percent _____ 22
Selectivity to isoprene, percent _____ 75
Purity of isoprene (in $C_5$ fraction), percent _____ 99.1

What we claim is:

1. A process of producing isoprene which comprises reacting isobutylene with formaldehyde in vapor phase in contact with a catalyst composed of phosphoric acid and at least one member selected from the group consisting of oxides and hydroxides of chromium.

2. A process of producing isoprene which comprises reacting isobutylene with formaldehyde in vapor phase in contact with a catalyst composed of phosphoric acid and at least one member selected from the group consisting of oxides and hydroxides of manganese.

3. A process of producing isoprene which comprises reacting isobutylene with formaldehyde in vapor phase in contact with a catalyst composed of phosphoric acid and at least one member selected from the group consisting of oxides and hydroxides of silver.

4. A process of producing isoprene which comprises reacting isobutylene with formaldehyde in vapor phase in contact with a catalyst composed of phosphoric acid and at least one member selected from the group consisting of oxides and hydroxides of iron.

References Cited by the Examiner

UNITED STATES PATENTS

| | | | |
|---|---|---|---|
| 2,977,396 | 3/1961 | Stanley et al. | 260—681 |
| 3,004,084 | 10/1961 | Oldham | 260—681 |
| 3,056,845 | 10/1962 | Bennett et al. | 260—681 |

FOREIGN PATENTS 863,137    3/1961    Great Britain.

DELBERT E. GANTZ, *Primary Examiner.*

ALPHONSO D. SULLIVAN, *Examiner.*

R. H. SHUBERT, *Assistant Examiner.*